US006947271B1

(12) United States Patent
Gronowicz, Jr.

(10) Patent No.: US 6,947,271 B1
(45) Date of Patent: Sep. 20, 2005

(54) RESETTABLE OVERCURRENT PROTECTIVE POWER PORT WITH BUILT-IN TRIP ADJUSTMENT

(75) Inventor: William Gronowicz, Jr., Westland, MI (US)

(73) Assignee: Yazaki North America, Canton, MI (US)

( * ) Notice: Subject to any disclaimer, the term of this patent is extended or adjusted under 35 U.S.C. 154(b) by 300 days.

(21) Appl. No.: 10/301,888

(22) Filed: Nov. 22, 2002

(51) Int. Cl.[7] .................................................. H02H 5/04
(52) U.S. Cl. ..................................... 361/93.1; 361/93.8
(58) Field of Search ............................... 361/93.1, 103, 361/115, 106, 58, 93.7, 93.8, 93.9; 439/668

(56) References Cited

U.S. PATENT DOCUMENTS 2,883,510 A * 4/1959 Krautwurst et al. ........ 219/264
5,171,293 A 12/1992 Umemoto et al.
5,401,935 A * 3/1995 Smith et al. ................ 219/206
5,569,053 A * 10/1996 Nelson et al. .............. 439/668
5,751,208 A 5/1998 Martinez
5,816,858 A 10/1998 Kazarian et al.
6,147,850 A 11/2000 Gronowicz, Jr. et al.

* cited by examiner

*Primary Examiner*—Brian Sircus
*Assistant Examiner*—Danny Nguyen
(74) *Attorney, Agent, or Firm*—Young & Basile, P.C.

(57) ABSTRACT

An auxiliary power port such as is found in an automotive vehicle passenger compartment has a receptacle connected with the vehicle electrical system and a sleeve rotatably mounted in the receptacle to receive a standard adapter plug of the type intended for use with automotive power ports. The sleeve is insulatively spaced from the inner surface of the receptacle, and includes at least one and preferably multiple PTC elements conductively sandwiched between the sleeve and the receptacle. The PTC elements are rotatable into and out of a non-conductive window in the receptacle to selectively adjust the overcurrent protection level provided by the power port, and to disconnect the PTC elements from current to allow them to reset after being tripped by overcurrent.

13 Claims, 2 Drawing Sheets

RESETTABLE OVERCURRENT PROTECTIVE POWER PORT WITH BUILT-IN TRIP ADJUSTMENT

FIELD OF THE INVENTION

This invention relates in general to auxiliary power ports such as those used in automotive vehicles, and more specifically to such a power port incorporating a positive temperature coefficient element to protect devices supplied with power by the port from overcurrent conditions.

BACKGROUND OF THE INVENTION

Auxiliary power ports are commonly provided in the passenger compartment of automotive vehicles to allow electrical devices such as cigarette lighters, cellular phones, radar detectors, small televisions, and the like to be connected with and receive power from the vehicle electrical system.

The automotive industry has adopted a standard size and configuration for such power ports. This standard configuration is a hollow, cylindrical receptacle, all or part of the interior surface of which is electrically conductive and connected to the positive or "hot" wire of a direct current circuit, and a terminal disposed at the bottom of the receptacle and connected to electrical ground. The standard adapter plug for mating with such a receptacle has a first terminal that is biased radially outward from the side of the plug to contact the interior surface of the receptacle, and a second terminal at its tip for contacting the ground terminal at the bottom of the receptacle.

The circuit of the vehicle electrical system which supplies electric power to the auxiliary power port is usually protected from overcurrent conditions by a fuse or circuit breaker that is usually located in a power distribution center or fuse block remote from the power port. The fuse or circuit breaker must be rated at a high enough amperage to permit functioning of the highest amperage electrical device that may be inserted into the power port. Consequently, any electrical device with a lower amperage rating will not be protected against overcurrent conditions, but rather may be damaged by levels of current that do not cause the fuse to blow or the circuit breaker to trip.

It is known to provide an adapter plug of an electrical device with a conventional cylindrical fuse having an amperage rating appropriate for the particular electrical device. An example of such an adapter plug is disclosed in U.S. Pat. No. 5,199,904. Such an adapter plug, however, may be larger than is desirable in order to house the fuse. Also, once the fuse blows, the adapter plug must be partially disassembled and replaced with a spare fuse in order that the device may be used once again.

It is also known to protect an electrical circuit from overcurrent conditions by making use of a positive temperature coefficient (PTC) material. Such materials exhibit an electrical resistivity that is relatively low at a design operating temperature band and increases abruptly as the temperature of the material rises beyond a critical temperature. PTC materials include compositions such as conductive polymers and ceramics.

A PTC circuit overcurrent protection device comprises a layer of PTC material sandwiched between two parallel plates of electrically conductive metal. An electrical lead is attached to each of the plates and the leads are connected to the electrical circuit. At a given operating temperature, there is a maximum steady level of electrical current that can pass from one plate to the other through the PTC material without causing significant resistance heating of the device. This level of current is dependent primarily upon the surface area of the layer of PTC material across which the current must flow in passing from one plate to the other, and is known as the "pass" or "hold" current.

Such a PTC device is designed so that when it is subjected to a level of current greater than the pass current, sufficient resistance heating of the device occurs to cause the temperature of the PTC material to climb above the critical temperature and "trip". When this occurs, the electrical resistivity of the PTC layer becomes so great as to create what is essentially an open circuit. A very low level of current continues to pass between the metal plates, however, and this "trickle" of current may be sufficient to prevent the temperature of the device from dropping back below the critical temperature. The circuit must be broken at some other point, for example by switching off an electrical device powered by the circuit, in order for the trickle of current to cease and allow the PTC device to cool down to below its critical temperature so that the PTC material resumes its lower resistivity state. Once this occurs, the PTC circuit overcurrent protection device has essentially reset itself, without the need for any replacement or maintenance of the device, and is again able to provide protection against overcurrent conditions when the electrical device is switched back on.

It is further known to use a PTC overcurrent protection device in an auxiliary power port. U.S. Pat. No. 6,147,850 discloses an auxiliary power port comprising a receptacle that is connected with the vehicle electrical system and a tubular, removable sleeve that fits inside the receptacle and that receives an adapter plug of the type intended for use with automotive power ports. The exterior surface of the sleeve is covered with a layer of PTC material, and insertion of the sleeve into the receptacle places the PTC layer in contact with the inner surface of the receptacle. The inner surface of the receptacle, the outer surface of the sleeve, and the PTC layer sandwiched therebetween form a PTC circuit overcurrent protection device. The power port in one embodiment includes two or more interchangeable sleeves, each of which has a different hold current. The hold current of a sleeve may be adjusted by varying the amount and/or the type of PTC material applied thereto. Providing a number of sleeves with varying hold currents allows the sleeve having the correct amperage rating for a particular electrical device to be selected and inserted into the receptacle prior to insertion of the adapter plug. In this way, the amperage rating of the circuit protection for the power port may be conveniently changed to provide the correct amperage level of protection for the particular device being used.

The adjustable power port of the '850 patent requires extra sleeves to take advantage of the adjustability, and maintaining a supply of extra sleeves and changing the sleeves may not be desirable in all cases after the original installation. To the extent that a first sleeve is initially chosen for the maximum anticipated amperage of one or more plug-in electrical devices, lower amperage devices may be susceptible to overcurrent damage unless the first sleeve is replaced with a second sleeve having a lower pass current. And, after an overcurrent condition has occurred, breaking the trickle of latch current holding the PTC power port in a tripped, essentially open state requires either turning the electrical device off or disconnecting the circuit's breaker or fuse in order to reset the power port.

BRIEF SUMMARY OF THE INVENTION

The present invention is a power port with PTC overcurrent protection, in which both the adjustability of the PTC overcurrent protection level and the resettability of the tripped port are built in. These are achieved with a multi-element PTC conductive inner sleeve rotatably mounted in a conductive outer receptacle with an insulative spacing between them. The PTC elements are separate segments, spaced from one another but electrically connectable in parallel through the conductive wall of the inner sleeve. The PTC elements are located on the outer wall of the inner sleeve and have a thickness that places them in sliding electrical contact with the outer receptacle. The outer receptacle has a non-conductive portion or "window"alignable with one or more of the PTC elements to vary the number of elements in circuit between the sleeve and the receptacle. The non-conductive window is large enough to encompass all of the PTC elements, thereby breaking electrical contact between the inner sleeve and outer receptacle through the PTC elements when all of the PTC elements are moved into the window. Accordingly, by selectively aligning the PTC elements with the non-conductive window, the level of PTC overcurrent protection can be adjusted and tripped PTC elements can be reset.

The selection of PTC overcurrent protection levels is preferably well-defined, with each of the separate PTC elements being sequentially movable into or out of the window to establish a stepwise adjustment of the overcurrent protection level up or down. In one form this stepwise adjustment is achieved with a series of detents on the inner and/or outer sleeves, the detents corresponding to different combinations of the PTC elements in and out of the window. In another form, markings on the visible upper edges or faces of the inner and/or outer sleeves visibly indicate the level of PTC overcurrent protection defined by positions of the PTC elements relative to the non-conductive window.

The PTC elements can be protected against abrasion by coating or plating their outer surfaces with conductive metal to slide against the outer sleeve.

The power port is accordingly easily adjusted to the most appropriate overcurrent protection level with a simple twist. If the overcurrent protection is tripped, the power port is easily reset, again with a simple twist to temporarily disconnect all of the PTC elements from any trickle current, allowing them to cool and reset to their conductive state.

These and other features and advantages of the invention will become apparent upon further reading of the specification, in light of the accompanying drawings.

DETAILED DESCRIPTION OF THE INVENTION

Figure 1:
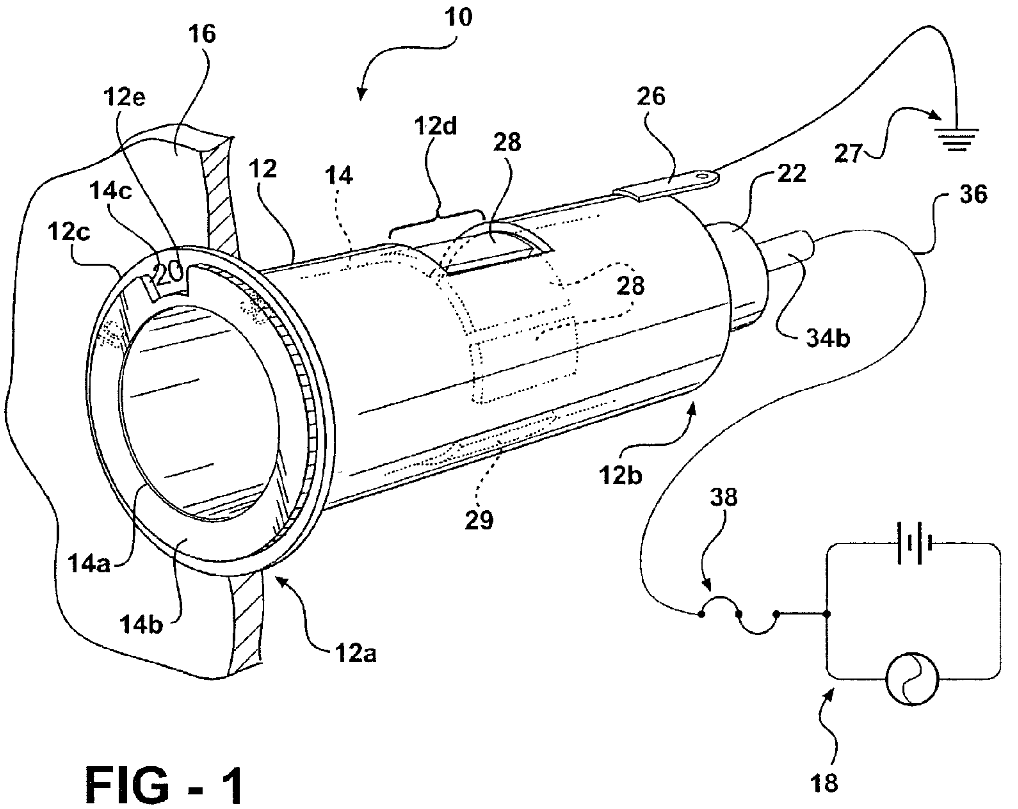
FIG. 1 is a perspective view from the dashboard end of a power port according to the invention, shown electrically connected in schematic fashion to a vehicle electrical circuit.
Figures 2, 3:
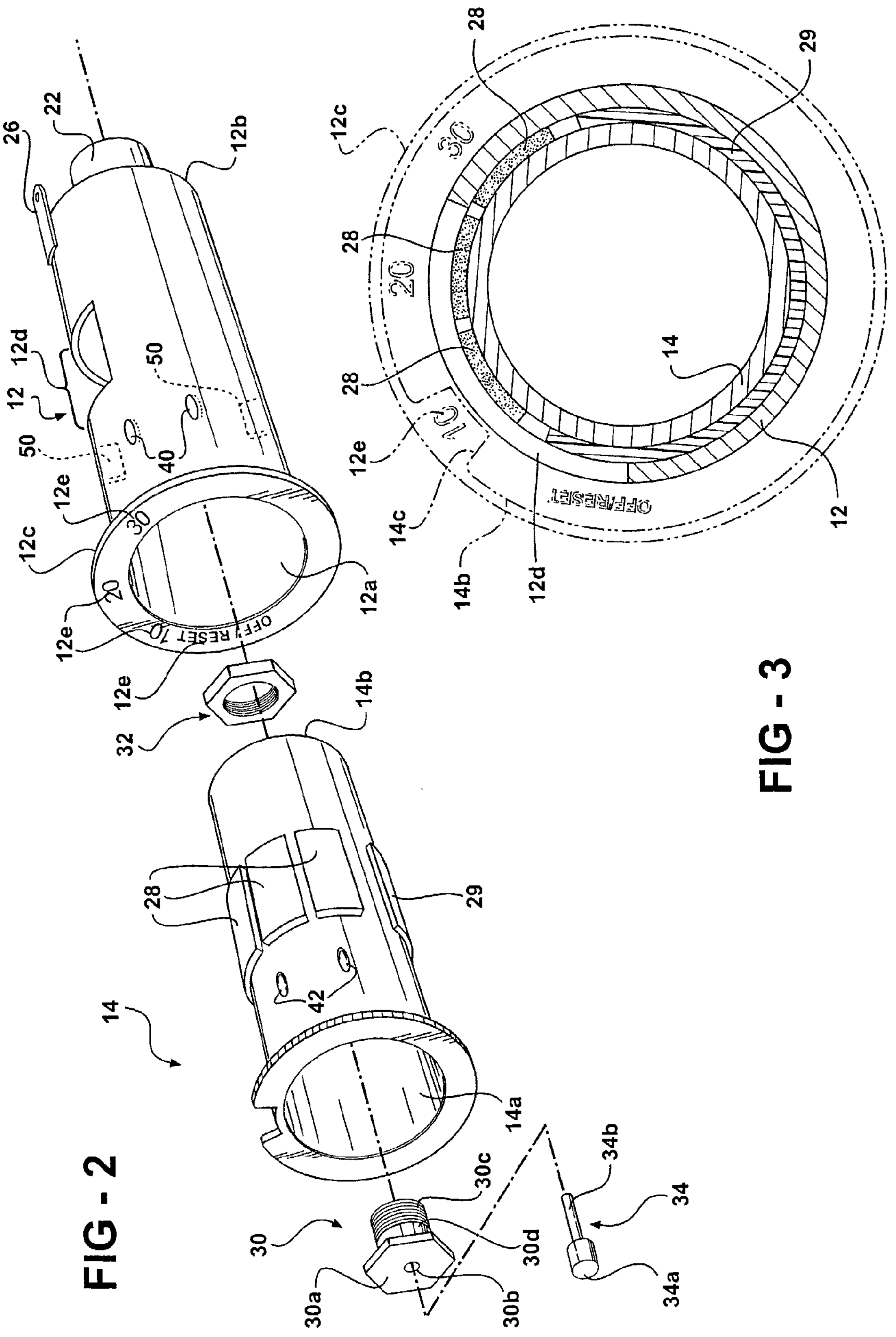
FIG. 2 is an exploded perspective view of the power port of FIG. 1.
FIG. 3 is an end cross-sectional view of the assembled power port of FIG. 1, taken through the non-conductive window and PTC elements, with dashboard-end selection indicia showing a first overcurrent protection setting in phantom.

Referring to FIGS. 1 and 2, an auxiliary power port 10 according to the present invention is seen to include a receptacle 12 and a tubular inner sleeve 14 that is inserted in the receptacle. The receptacle 12 is adapted for installation, in conventional manner, flush with a panel 16 in a vehicle passenger compartment, and is connected to the vehicle electrical system 18. The sleeve 14 is of the correct interior diameter and length to receive a standard adapter plug (not shown) of an electrical device commonly used by passengers in the vehicle, for example a cellular phone, radar detector, light, computer, or television designed or adapted to use vehicle power from such a port.

The receptacle 12 comprises a tubular barrel having an open upper end 12*a* and a closed lower end 12*b*, a mounting rim 12*c* projecting radially outward from the upper end of the barrel, and an internally threaded projection 22 extending axially from the lower end. One or more spring clips may be formed in known fashion on the outer surface of the barrel, projecting radially outwardly from the receptacle 12 to aid in retaining the receptacle 12 within an opening in panel 16 in which it is mounted, and may be formed integrally with the barrel by a stamping procedure. A connection tab 26 extends from the lower end of the receptacle 12 to provide a point for connecting the receptacle 12 with electrical ground 27. The receptacle is formed from an electrically conductive metal. The outer surface of the receptacle 12 may be coated with or otherwise enclosed by an electrically insulating material if necessary to reduce the likelihood of electrical shorting when the receptacle 12 is installed in the vehicle.

As is best seen in FIGS. 1 and 2, the inner surface of the receptacle 12 is preferably slightly conical in shape, having a very shallow taper narrowing toward the bottom of the receptacle. A possible range of taper angles is from 1°to 4°.

Receptacle 12 includes a non-conductive window 12*d* formed on, through, or in its inner conductive surface, in the illustrated embodiment made by forming an aperture through the wall of the receptacle. Window 12*d* defines a non-conductive region on a portion of the inner surface of the receptacle. The non-conductive window may be formed by other structures or methods, for example with a coating or film applied to the inner surface of the receptacle, or with a region of non-conductive wall material.

Receptacle 12 also includes indicia 12*e* formed on the outer face of mounting rim 12*c* to be visible from the exterior of panel 16 in which receptacle 12 is mounted. These indicia correspond to different levels of overcurrent protection and/or reset states of the power port as described further below.

Inner sleeve 14 comprises a thin tube of electrically conductive metal having an open upper end 14*a* and a closed lower end 14*b*. Sleeve 14 is also preferably slightly conical in shape, having a taper angle matching that of the receptacle 12, but sized to maintain an insulative spacing from the inner surface of the receptacle once inserted therein. A circumferential portion of the outer surface of sleeve 14 is provided with a region of positive temperature coefficient (PTC) material in the form of two or more spaced PTC elements 28. In the illustrated embodiment each PTC element 28 is formed by one or more layers of PTC material applied to the conductive outer surface of sleeve 14, with a thickness putting it in electrical contact with the inner surface of the receptacle. An insulating spacer 29 having a thickness equal to the thickness of elements 28 is located on generally the opposite side of sleeve 14, formed from a non-conductive, relatively low friction material such as plastic.

Sleeve 14 is designed to be rotatably mounted relative to receptacle 12. In the illustrated embodiment this is achieved with an externally threaded stud 30 (FIG. 2) formed from an electrically insulative material such as plastic, extending axially through a hole in the lower end of the sleeve 14. Head 30*a* rests on the bottom of sleeve 14 and has a hole 30*b* passing through its central axis. An electrically insulative nut 32 is threaded over the lower, threaded end 30*c* of stud 30 from outside the sleeve to retain the stud in the sleeve. The threads of threaded end 30*c* stop at a point spaced from head 30*a* to define an unthreaded portion 30*d* on which the nut is free to rotate against the bottom of the sleeve, which in turn allows sleeve 14 to rotate in receptacle 12 after being mated to receptacle 12 by the lower threaded end of stud 30. A terminal pin 34 is inserted through the hole 30*b* in the upper end of the stud, with a head 34*a* resting atop head 30*a* in the bottom of the sleeve and a shaft 34*b* extending downwardly through hole 30*b* such that its lower end extends beyond the lower end of the stud, as shown in FIG. 1.

Receptacle 12 is installed in the vehicle such that the connection tab 26 is in contact with electrical ground 27 (FIG. 1). The sleeve 14 is then inserted into the interior of the receptacle 12 such that the threaded stud 30 enters the mating threaded projection 22 at the bottom of the receptacle 12, and the sleeve is rotated relative to the receptacle to screw the sleeve 14 downwardly into the receptacle until the sleeve's PTC elements 28 and spacer 29 are wedged into sliding engagement with the conductive inner surface of the receptacle due to the matching taper of the surfaces of the sleeve and receptacle. The terminal pin 34 projects through the threaded projection 22 at the bottom of the receptacle 12 and makes contact with a mating terminal or wire 36 disposed within the mounting position in the vehicle to connect the receptacle 12 with the vehicle electrical system 18.

As the sleeve 14 is screwed down into the receptacle 12, the wedging engagement between PTC elements 28 and spacer 29 on the sleeve and the inner surface of the receptacle urges the outer surfaces of the PTC elements 28 into good electrical contact with the interior of receptacle 12 so that electric current can flow from receptacle 12 through the PTC elements to sleeve 14, and hence to any electrical device plugged into the power port. As best shown in FIG. 1, the thickness of PTC elements 28 and spacer 29 and the relative dimensions of receptacle 12 and sleeve 14 are such that only PTC elements 28 and spacer 29 are in contact with the receptacle; the remainder of the sleeve's exterior surface remains spaced from the receptacle, with the exception of momentary contact between detents 40 and 42 described below. PTC elements 28 may be coated or surfaced with a protective layer of conductive metal to protect the PTC material from abrasion as they slide against the interior surface of the receptacle.

The PTC material in elements 28 is electrically conductive when at a normal operating temperature, but "trips" to a non-conductive state if the temperature of the PTC material reaches a critical level when the current flowing through the PTC elements exceeds their designed pass current. The fuse or circuit breaker 38 associated with the vehicle electrical system 18 is rated at a higher amperage than the power port's PTC pass current, so it does not blow or trip, but rather continues to protect the system in case of a direct short.

To use an electrical device with the power port 10, its adapter plug (not shown, but of known type) is pushed into the receptacle assembly such that an end contact at the tip of the plug presses against the terminal pin head 34*a* at the bottom end of sleeve 14, and a spring contact on the side of the plug is urged against the inner surface of the sleeve 14.

Each of the PTC elements 28 in the illustrated embodiment is of equal surface area and thickness and is made from the same PTC material, with each element having the same pass current or overcurrent trip level. PTC elements 28 are spaced from one another but electrically connected in parallel through the conductive wall of sleeve 14, such that their overcurrent protection is summed up as a multiple of the number of elements in full contact with receptacle 12. In the illustrated embodiment, each element 28 has a pass current rating of 10 amps, i.e. each is designed to trip at current over 10 amps. With all three elements 28 in contact with the wall of receptacle 12, the overcurrent protection level for the power port is accordingly 30 amps; with two elements in contact with the receptacle, 20 amps; and with one element in contact with the receptacle, 10 amps. It will of course be understood by those skilled in the art that the elements 28 need not be identical to one another as to the current levels at which they trip, but for purposes of explanation and in a preferred manner those shown in the present example are identical 10 amp elements.

Power port 10 is both adjustable in terms of overcurrent protection and resettable from a tripped state. PTC elements 28 on sleeve 14 are in circumferential alignment with window 12*d*, which is large enough to "cover" or encompass all of the PTC elements simultaneously. Rotating sleeve 14 in receptacle 12 accordingly moves elements 28 into and out of window 12*d*. The separate, spaced nature of elements 28 allows them to be rotated into window 12*d* in different combinations: all, some, or none. Since PTC elements 28 provide the sole current path between sleeve 14 and receptacle 12, the parallel overcurrent protection they provide can be adjusted by rotating different numbers of elements into and out of window 12*d*.

With all of elements 28 in window 12*d*, only the insulating spacer 29 remains in contact with the conductive wall of the receptacle, thereby breaking the flow of current between receptacle 12 and sleeve 14 through elements 28. This defines an "off" or "reset" position allowing the PTC elements to cool and reset to a conductive state. When all of elements 28 are in window 12*d*, the spacing between the inner sleeve 14 and the conductive wall of receptacle 12 is maintained by spacer 29, which has a sufficient circumferential length (preferably greater than half the circumference of the sleeve, up to the ends of the PTC elements 28) to keep sleeve 14 centered in receptacle 12.

Although the overcurrent protection level of power port 10 can be factory-set by selecting the appropriate number of PTC elements and confirming their presence in or absence from window 12*d*, it may be desirable to make the adjustment available to persons operating or maintaining the power port after installation, where window 12*d* typically will not be visible. This is achieved in the illustrated embodiment with user-visible indicia 12*e* such as numbers, words and/or symbols that reflect the rotational positions of the PTC elements 28 relative to window 12*d*. In the example of FIGS. 1 through 4, numerals "10", "20", and "30" reflect combinations of one, two, and three 10-amp elements 28 in contact with the wall of receptacle 12, rotated out of window 12*d*. An additional "Off/Reset" position corresponding to all three elements 28 rotated into window 12*d* allows the user to turn the power port off or reset the port if tripped by overcurrent.

FIG. 3 shows power port 10 set to the 10-amp overcurrent protection level, evidenced by the numeral "10" visible through aperture 14*c* in the flange 14*b* on the open upper end of sleeve 14. Two elements 28 are in window 12*a*, and one element 28 is in electrical contact with receptacle 12.

Figure 4:
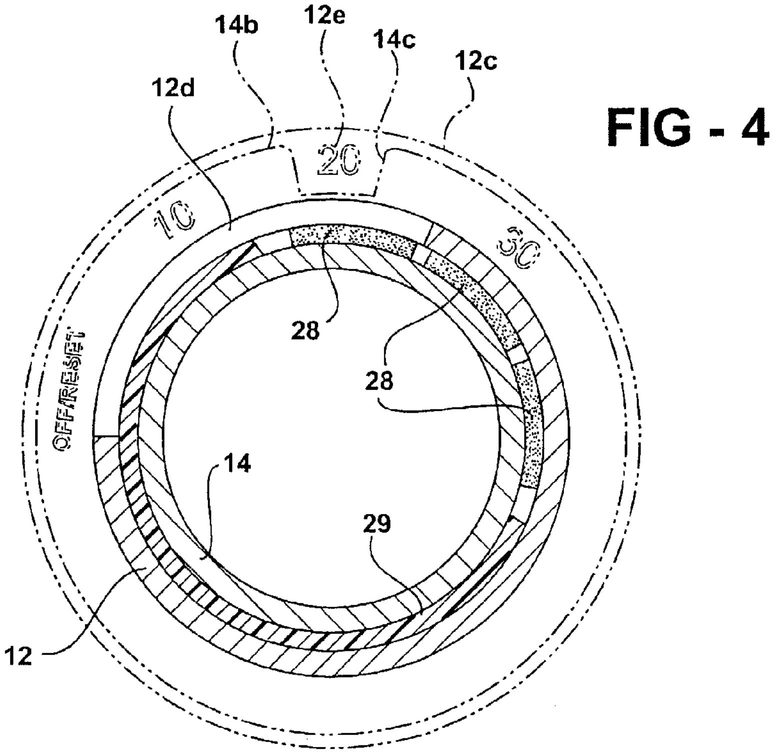
FIG. 4 is similar to FIG. 3, but showing the power port rotated to a second overcurrent protection setting.

FIG. 4 shows power port 10 set to the 20-amp overcurrent protection level, with the numeral "20" visible through aperture 14*c*. One element 28 has been rotated into window 12*d*, and two elements 28 remain in electrical contact with receptacle 12.

Although visible indicia such as 12*e* can be used to define the different overcurrent protection levels, a more positive indication of the stepwise adjustment from one level to another may be desirable. A series of detents and stops is accordingly placed on the inner surface of receptacle 12 and the outer surface of sleeve 14 to give tactile indications of the movement of elements 28 into and out of the window, and optionally to limit the degree to which sleeve 14 can be rotated in either direction.

FIG. 2 shows one possible arrangement of detents and stops, in which two insulated detents 40 are formed on the inner surface of receptacle 12, for example by dimpling the wall material inwardly to create raised, rounded bumps in the space between the receptacle and the sleeve 14, and coating the raised bumps with an insulator such as plastic. Detents 40 are relatively shallow, with a height approximately one-half the distance between sleeve 14 and receptacle 12. Sleeve 14 is provided with a similar set of detents 42 raised outwardly toward receptacle 12 and detents 40, for example by dimpling the sleeve wall above the band encircled by elements 28 and spacer 29. The relative positions of detents 40 and 42 and the elements 28 is established such that rotation of a leading element 28 into window 12*d* requires that the frictional interference between a first sleeve detent 42 and a first receptacle detent 40 be overcome, for example with a tangible and audible click. Rotation of the second (middle) element 28 into window 12*d* requires first sleeve detent 40 to be forced over the second receptacle detent 42 as the sleeve is rotated, again giving a clear indication that the entirety of an element 28 has been rotated into the window. Additional detents 42 placed on sleeve 14 in circumferential alignment with receptacle detents 40 can improve the definition of adjustment in a manner that will be apparent to those skilled in the art.

The rotational range of motion of sleeve 14 in receptacle 12 can be limited with the addition of stops 50 placed on or formed in the inner surface of receptacle 12 (shown) or on the outer surface of sleeve 14 to engage detents 42 or 40, respectively, in a manner that blocks further rotation. Stops 50 in the illustrated embodiment are shown as more pronounced protrusions extending from the interior surface of receptacle 12. Stops 50 are spaced circumferentially above and to each side of the band of PTC elements 28, aligned with sleeve detent(s) 42 to block their rotational movement further than necessary to allow all three PTC elements 28 to be simultaneously in or out of window 12*d*.

The foregoing description of a preferred example of a power port according to the invention is one of many possible variations that will be apparent to those skilled in the art now that I have disclosed the invention in this manner. The example shown is subject to modification without departing from the scope of the invention as claimed below. For example, the number, shape, location, spacing and other attributes of the PTC elements on sleeve 14 can be varied for different installations and power port requirements. The structure(s) used to indicate and define each of the different overcurrent protection levels to a person adjusting the power port may also vary, the illustrated indicia and detent/stop structure being but two particular examples. While the sleeve is shown as being rotatable within a fixed receptacle, the rotation of the sleeve and receptacle is relative and may be achieved in different ways. These are but some of the possible ways in which the illustrated embodiment may be modified based on the foregoing disclosure.

I accordingly claim:

1. A power port for connecting a plug of an electrical device to an electrical circuit, the power port comprising:

a substantially cylindrical receptacle in electrical connection with the circuit;

a substantially cylindrical sleeve for receiving the plug therein, the sleeve being rotatably mounted within the receptacle with an insulative radial spacing from the receptacle; and a positive temperature coefficient (PTC) region located on a portion of an outer surface of the sleeve in the insulative spacing and conductively sandwiched between the sleeve and an inner surface of the receptacle to conduct electrical current therebetween under normal circuit conditions and to substantially block the electrical current therebetween when an overcurrent condition occurs, the receptacle having a non-conductive window on a portion of its inner surface and the PTC region being circumferentially aligned with the non-conductive window so as to be rotatable into and out of the non-conductive window.

2. A power port for connecting a plug of an electrical device to an electrical circuit, the power port comprising:

a receptacle in electrical connection with the circuit;

a sleeve for receiving the plug therein, the sleeve being movably mounted in the receptacle with an insulative spacing from the receptacle; and a positive temperature coefficient (PTC) region located on a portion of an outer surface of the sleeve in the insulative spacing and conductively sandwiched between the sleeve and an inner surface of the receptacle to conduct electrical current therebetween under normal circuit conditions and to substantially block the electrical current therebetween when an overcurrent condition occurs, the receptacle having a non-conductive window on a portion of its inner surface, the PTC region comprising a plurality of discrete PTC elements located on the outer surface of the sleeve, the PTC elements being sequentially movable into and out of the non-conductive window when the sleeve is moved relative to the receptacle.

the PTC elements, when in contact with the inner wall of the receptacle being electrically connected in parallel such that their overcurrent protection levels are cumulative when conductively sandwiched between the receptacle and the sleeve.

3. The power port of claim 2, wherein the receptacle and sleeve are both substantially cylindrical and the sleeve is disposed concentrically within but radially spaced from the inner wall of the receptacle and wherein the sleeve is rotatably mounted relative to the receptacle, and the PTC elements are circumferentially aligned with the non-conductive window so as to be rotatable into and out of the non-conductive window.

4. The power port of claim 2, wherein the non-conductive window is large enough to receive all of the PTC elements at the same time, thereby to electrically disconnect the sleeve from the receptacle.

5. The power port of claim 2, wherein the power port includes a visible indicator of the positions of the PTC elements in or out of the non-conductive window.

6. The power port of claim 2, wherein the power port includes a tactile indicator of the positions of the PTC elements in or out of the non-conductive window.

7. The power port of claim 2, wherein the power port includes sequential movement means associated with the PTC elements to mark the movement of each PTC element into and out of the non-conductive window.

8. The power port of claim 7, wherein the sequential movement means comprises a set of detents between the receptacle and the sleeve.

9. The power port of claim 3, wherein the rotation of the PTC elements is limited to a range necessary to place all of the PTC elements in the non-conductive window and to remove all of the PTC elements from the window.

10. The power port of claim 3, wherein the PTC elements are located on a first circumferential segment of the sleeve, and an insulative spacer is located on a second circumferential segment of the sleeve opposite the PTC elements, the spacer being sandwiched non-conductively between the sleeve and the receptacle and being rotatable with the sleeve.

11. A power port for connecting a plug of an electrical device to an electrical circuit, the power port comprising:

a receptacle in electrical connection with the circuit;

a sleeve for receiving the plug therein, the sleeve being mounted in the receptacle with an insulative spacing from the receptacle; and a plurality of positive temperature coefficient (PTC) elements located on a portion of one of the sleeve and the receptacle in the insulative spacing and conductively sandwiched between the sleeve and the receptacle to conduct electrical current therebetween under normal circuit conditions and to substantially block the electrical current therebetween when an overcurrent condition occurs, the PTC elements being circumferentially spaced, one of the sleeve and the receptacle further having a non-conductive window positioned in circumferential alignment with the PTC elements, and the sleeve and the receptacle being relatively rotatable such that the PTC elements and can be selectively moved into and out of the non-conductive window to break the conduct of electrical current between the sleeve and the receptacle through the PTC elements.

12. The power port of claim 11, wherein the PTC elements are electrically connected in parallel.

13. The power port described in claim 11 wherein all of the elements are alike.

* * * * *